United States Patent [19]

Liu

[11] Patent Number: 4,604,297

[45] Date of Patent: Aug. 5, 1986

[54] TRANSMISSION ENHANCING COATING

[76] Inventor: Peter D. Liu, 70 Marcellus Rd., Newton, Mass. 02159

[21] Appl. No.: 689,388

[22] Filed: Jan. 7, 1985

Related U.S. Application Data

[63] Continuation-in-part of Ser. No. 636,369, Jul. 31, 1984, Pat. No. 4,582,761.

[51] Int. Cl.$^4$ ............ B05D 5/06; B05D 5/12; B05B 5/00
[52] U.S. Cl. .................................... 427/64; 427/108; 427/110; 427/160; 427/161; 427/164; 427/165; 427/168
[58] Field of Search .............. 427/64, 108, 110, 160, 427/164, 165, 168, 161

[56] References Cited

U.S. PATENT DOCUMENTS

| | | | |
|---|---|---|---|
| 2,734,142 | 2/1956 | Barnes | 313/92 |
| 3,374,130 | 3/1968 | Junge et al. | 156/24 |
| 3,485,662 | 12/1969 | Metevia et al. | 427/161 X |
| 3,576,356 | 4/1971 | Hyman et al. | 350/156 |
| 3,679,451 | 7/1972 | Marks et al. | 117/33.3 |
| 3,697,277 | 10/1972 | King | 96/50 PL |
| 3,736,050 | 5/1973 | Bohum | 350/316 |
| 4,168,332 | 9/1979 | Leinen | 427/160 |
| 4,246,613 | 1/1981 | Choder | 358/245 |
| 4,251,572 | 2/1981 | Herliczek et al. | 427/161 X |
| 4,332,861 | 6/1982 | Franz et al. | 427/161 X |

Primary Examiner—James R. Hoffman

[57] ABSTRACT

A method of controlling light transmission through a reflective/transmissive surface by first creating surface irregularities having an anti-glare effect and then applying an inert liquid coating sufficiently thick to remove at least some, but not all, of the anti-glare effect. The surface irregularities are created by applying a dispersion and allowing it to dry to form a coating that reduces reflected glare at the surface. The dispersion is a dispersion of polyvinyl acetate particulates and water or acrylic particulates and water; alternatively, the dispersion comprises a matte varnish comprising an aqueous dispersion of an acrylic resin, and an aqueous dispersion of polyvinyl acetate.

9 Claims, 3 Drawing Figures

TRANSMISSION ENHANCING COATING

This is a continuation-in-part of my co-pending U.S. patent application Ser. No. 636,369 filed July 31, 1984, now U.S. Pat. No. 4582761 which is hereby incorporated by reference.

BACKGROUND OF THE INVENTION

This invention relates to compositions and methods for treating a reflective-transmissive surface to reduce reflected glare and to surfaces that have been so treated.

Items of various sorts are viewed through an abutting transmissive surface. For example, glass or plastic surfaces are used to protect the electronic viewing screens. By the term "electronic viewing screens," I mean to include viewing screens of all types including, without limitation, screens for television sets, video display terminals, television monitors, test equipment screens, word processor screens, mini-computer screens, main frame computer monitors, other cathode-ray tube screens, liquid crystal displays (LCD's), light emitting diodes (LED's), watches, oscilloscopes, plasma screens, and electroluminescent displays (EL's). By television sets and television monitors, I mean to include black and white television, color television, red/green/blue monitors, green monitors, and amber monitors; I also mean to include digital as well as raster scanning television sets and vector sets. Artwork or photographs may have intrinsically reflective surfaces, or they may be protected by glass or plastic.

Locations for viewing such surfaces may generate serious glare. For example, the surfaces may reflect room lights or light entering through room windows. In the workplace, various equipment may reflect fluorescent lights or incandescent lights as well as window light. Such glare is annoying. More important, it prevents transmission of information and images, it causes squinting and headaches, and it is generally fatiguing and efficiency reducing. There have been considerable complaints about these problems from those who use such screens regularly—for example, office workers.

The problem to be addressed is allowing light to pass from the viewing surface to the viewer, while at the same time significantly reducing or eliminating reflections from that surface. Specifically, where the viewing surface is a glass or plastic surface, light must be transmitted through the surface from an object immediately therebehind, and light impinging on the surface from the viewer's side must be effectively dispersed to avoid objectionable reflection.

In some cases, glare reduction may be achieved at the expense of the quality of the transmitted image. It is highly desirable to be able to control the amount of glare reduction so that glare reduction and transmitted image quality are maximized for a given application.

Various efforts to reduce glare have been disclosed.

Junge et al. U.S. Pat. No. 3,374,130 discloses an etching process for producing low specular reflecting or low image reflecting surfaces on glass.

Leinen U.S. Pat. No. 4,168,332 discloses a non-glare abrasion resistant coating for glass or plastic that protects and overlies artwork. The coating is made by spraying a polymerizable solution comprising an epoxy prepolymer of an epoxy-terminated silane and an oxirane copolymer onto the glass.

King U.S. Pat. No. 3,697,277 discloses a non-glare reflective photographic print having a matte-surfaced polyester film—for example, poly (ethylene)terephthalate, permanently bonded to the photographic emulsion.

Marks et al. U.S. Pat. No. 3,679,451 discloses coatings for decreasing reflected images from the surface of a transparent sheet used for displays; the coatings are mixtures of organic and inorganic polymers—for example, a mixture of polyvinyl butyral, polyvinyl alcohol acetate copolymer and polysilic acid.

Bohum, U.S. Pat. No. 3,736,050, discloses a filter with an anti-reflective coating to be used with a cathode-ray tube.

Hyman et al., U.S. Pat. No. 3,576,356, disclose a multi-layer anti-glare coating for a cathode-ray tube implosion shield. The coating is a semiconductive material sandwiched by dielectric layers so that a voltage pen can make electrical contact through the dielectric layers to the semiconductive layer.

Barnes, U.S. Pat. No. 2,734,142, discloses a reflection reduction coating comprising discrete microgranular transparent solid particles that are deposited by a spinning process on a lens adapted for a cathode-ray tube. A color neutralizing layer is provided at the surface of the lens.

SUMMARY OF THE INVENTION

In one aspect, the invention features a method of improvement of image transmission through a transparent viewing surface comprising surface irregularities to control glare. According to the method, an inert fluid coating is applied to the surface to have sufficient thickness to remove some, but not all, of the anti-glare effect of the surface irregularities. By gradually reducing the thickness of the image coating, it is possible to achieve an optimal balance of image quality and glare reduction, while at the same time retaining the ability to alter that balance to accommodate different glare environments and different types of imaging systems. By surface irregularities, I mean to include particulates that have been deposited or coated on a specular surface, irregularities created by etching or other processes for removing material, as well as other types of surface irregularities.

In a second aspect, the invention features a kit for treating a transparent specular surface to provide controlled anti-glare and controlled transmission through the surface. The kit comprises: (1) an anti-glare coating that includes an acrylic resin constituting a matte varnish, an aqueous dispersion of polyvinyl acetate, or both; and (2) an inert fluid coating.

In preferred embodiments, the viewing surface is an electronic screen, and the non-specular surface is the non-glare coating described above. The inert fluid coating is applied and then portions are removed to achieve controlled transmission. Also in preferred embodiments, the surface irregularities comprise surface particulates comprising a range of sizes so that the anti-glare effect of smaller particulates can be obscured without obscuring the anti-glare effect of larger particulates; and the incremental removal of the fluid coating will provide incremental control over the anti-glare effect. Finally, in preferred embodiments, the fluid coating is comprised of a substance that wets the surface particulates.

DESCRIPTION OF THE PREFERRED EMBODIMENT

Figure 1:
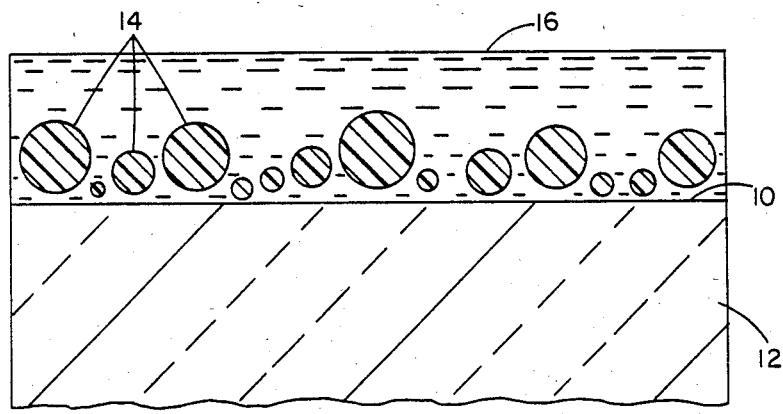
FIGS. 1, 2, and 3 are highly diagrammatic representations of the anti-reflective surface demonstrating control of surface irregularities.

The preferred embodiment will be described in terms of a fluid coating to be applied to one specific anti-glare coating that is described in my co-pending U.S. application referenced above. It will be understood, however, that the fluid coating could be applied to any of a large variety of anti-glare surfaces formed by a variety of techniques including coatings having different types of particulates and to surfaces which have been etched to create irregularities. In particular, the coating makes it practical to use particulate anti-glare materials that might not otherwise provide optimal image clarity. For example, the fluid coating provides acceptable anti-glare and image transmission properties when applied to an anti-glare coating that includes polyvinyl acetate alone or acrylic resin alone, even though, as described below, the preferred anti-glare coating includes both of these components.

THE ANTI-GLARE COMPOSITION

In the preferred embodiments, the surface includes an anti-glare composition having two major components. An aqueous dispersion of polyvinyl acetate (PVA) provides glare reduction. An aqueous dispersion of acrylic resin provides other useful properties and interacts with the PVA to improve the characteristics of the anti-glare coating as described below.

By polyvinyl acetate resin I mean resins such as those commonly used in latex paints, adhesives, surface coatings, and textile finishes, as typified by the following functional unit:

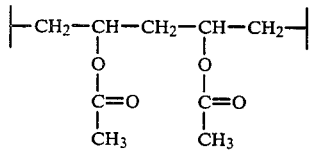

By acrylic resin I mean resins such as those typified by polymers and copolymers of methyl methacrylate, acrylic acid, and acrolein.

The preferred PVA dispersions are water soluble white adhesive. They dry to a generally clear coating with a glare reducing surface that disperses reflected light. These dispersions are relatively easy to work with, being non-toxic and water soluble. A suitable white adhesive dispersion is sold by Borden Chemical Co., Inc. of Columbus, Ohio.

The preferred acrylic resin is an aqueous acrylic emulsion. That emulsion is preferably a matte varnish which includes a flattening agent to preserve the anti-reflective quality of the coating. Cellite or other diatomaceous flattening agents are suitable, as are magnesium carbonate, alumina hydrate, wax, aluminum stearate, or zinc tungate. Roplex AC 234 (Rohm and Haas) is a suitable acrylic resin base to make acrylic paints, varnishes, etc. Utrecht Co., New York, N.Y., makes a suitable matte varnish.

In presently preferred formulations, an anti-foam additive is included to avoid irregularities in the coating caused by bubbles or foam. A surfactant or detergent may also be included to lower the surface tension of the dispersal, aid spreading, and improve the uniformity of the coating. Presently preferred surfactants are non-ionic alkylaryl polyether alcohol types such as the Triton series sold by Rohm and Haas Company, Philadelphia, Pa. Finally, a thickening agent such as sodium polyacrylate may be used to enhance the stability of the formulation. The Acrysol series sold by Rohm and Haas are such suitable agents.

FORMULATING THE ANTI-GLARE COMPOSITION

A preferred method for formulating the above-described composition to give improved coating characteristics is described below.

The polyvinyl acetate dispersion is blended with the acrylic dispersion in a volume/volume ratio of between 8:1 and 1:8, and most preferably about 1:2 or 1:3. The resulting mixture has a stiff, gum-like consistency far more viscous than the starting materials. Without being bound to any particular theory, it appears that the PVA and acrylic polymer interact to improve the distortion-free light-transmission properties.

The thick mixture is thinned with isopropyl alcohol while stirring, and then water is added. The alcohol should be added first to avoid agglomeration of the resins.

The resulting mixture is a smoother, more stable dispersion with benefits not provided by the separate components. Specifically, PVA without acrylic resin provides a non-glare surface but is not entirely distortion-free due to its consistency. Acrylic resin by itself provides insufficient viscosity and glare protection but improves the consistency and thus reduces distortion.

USE

The dispersion may be coated on the surface with any suitable applicating device such as a brush or sponge. If carefully applied and allowed to dry, it forms a durable, non-glare coating that does not interrupt transmission of light from the object being viewed.

Specifically, the coating is applied to glasses and plastics used to protect electronic viewing screens as defined above.

TRANSMISSION ENHANCEMENT

Without being bound to any particular theory, it appears that the above-described anti-glare coating functions at least in part as a result of irregular particles at the surface of the coating. The surface particles prevent reflection from what would otherwise be a specular glass-type screen surface, and the transmission of light will be generally acceptable, particularly for viewing relatively large objects such as the figure of a person performing in a television broadcast.

Nevertheless, additional fine detail may be desired, depending on the user and on the application. For example, when a CRT is used as a computer display monitor for alphameric characters or where additional clarity of facial features is sought for close-up viewing of a television broadcast, it may be desirable to enhance the detail and contrast above that provided through the anti-glare coating. Such control of the degree of the anti-glare effect and enhancement of contrast is provided by a second coating applied over the first. The second coating serves to reduce the irregularities in the first surface coating by smoothing it out. Significantly, the second coating is not so thick as to create a perfectly specular surface (i.e., by entirely obliterating the effect of surface particles); rather it only partially obliterates the anti-glare effect of the surface irregularities, e.g. by covering the smaller particulates, but not the larger particulates.

The degree of anti-glare and the amount of contrast and resolution can be controlled by controlling the thickness of the second layer. The thicker the fluid layer, the more of the surface irregularities that are obliterated—i.e., covered—and the fewer the irregularities that are large enough to remain uncovered, and therefore the more reflective the surface is. Control over the thickness of the fluid layer is provided by using a liquid coating substance that can be wiped off incrementally.

Figure 2:
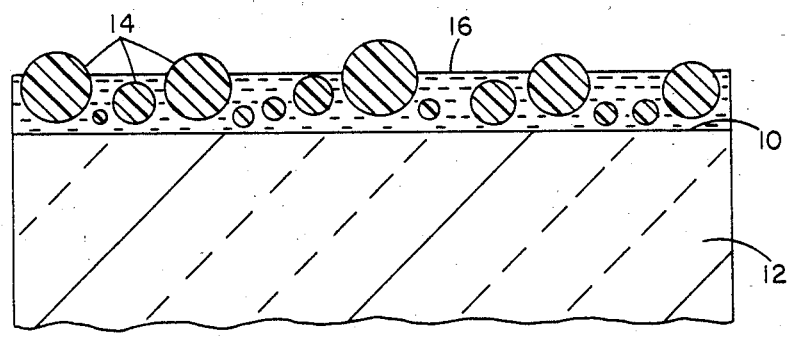
Figure 3:
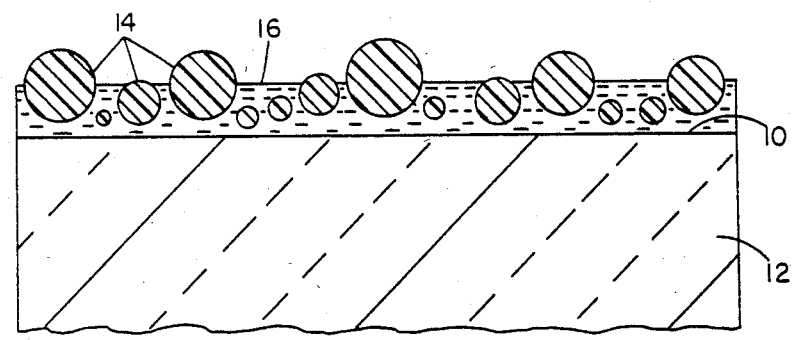

FIG. 1 depicts in a highly diagrammatic way a specular surface 10 of a transparent screen 12. Particulates 14 of varying sizes have been deposited on surface 10 to reduce the reflection of light incident on that surface. Finally, a fluid layer 16 has been applied to the surface to improve light transmission through screen 12. In FIG. 1, the fluid layer is so thick that it completely obscures the surface particulates 14 to provide specular surface. FIGS. 2 and 3 depict the same screen after increasing amounts of the fluid layer have been removed to increase the anti-glare properties of the screen of FIG. 1. In FIG. 2, the largest particulates extend through fluid layer 16, making the surface more irregular than in FIG. 1 and thus reducing reflection. In FIG. 3 more of the particulates extend through layer 16, and the surface irregularity is increased over that of FIG. 2.

Surprisingly, the thickness range control thus provided is such that it is possible to retain very substantial glare reduction which is adequate for most environments and applications, while at the same time improving the transmission quality to a degree that is particularly noticeable for images of smaller objects, e.g. characters on a computer display monitor.

The fluid coating should be a clear to semi-clear liquid or cream that does not itself introduce significant irregularity to the anti-glare surface. The fluid coating preferably remains in a fluid or liquid phase at the antiglare surface. The coating should not be degraded by heat experienced at the screen surface, and it should be inert to atmospheric components as well as to the components of the anti-glare coating and other electronic screen components.

Specific coating materials that can be used are:
hydrocarbon waxes and oils, clear acrylic coatings, polyethylene glycol, dibutylpthalates, polyvinyl alcohol, tributoxyethyl phosphates, dioctylpthalates, fatty acids, polyethylene, esters, squalane, polysynlane, hydraulic oil, sperm oil, automotive engine oil, technical oils, mineral oil, and vegetable oils (e.g. almond, cotton seed, olive, or rosewood oil).

The second coating may be applied manually using an absorbant pad, soft cloth, or low-lint paper as an applicator. A second pad or cloth may be used for controlled removal of part of the second coating until the desired properties are achieved.

The degree of anti-glare achieved can be determined visually or it can be measured by measuring the solid angle defined by a reflected laser beam. Using the solid angle reflected from glass as an index of 1, the anti-glare coating described above can be applied to increase the diffusion of the reflection by a factor of 10,000–40,000.

A fluid coating can then be applied to enhance the clarity of transmission without unacceptably reducing the anti-glare effect.

OTHER EMBODIMENTS

Other embodiments are within the following claims. For example, other dispersion vehicles can be used such as an alcohol/water vehicle for the acrylic resin. The coating may be applied by other methods such as by suitable spray apparatus, in which case a vehicle system with a more volatile organic component may be used. The method may be used for other surfaces such as for windows where privacy is desired without blocking out all light, or where it is desirable to filter out heat while still allowing some light to be transmitted.

The inert fluid coating may be used to control the transmission quality through and glare from non-specular surfaces other than those coated with the non-glare coating. For example, acid etched surfaces or frosted surfaces may be treated with the inert fluid coating to provide controlled transmission improvement and nonglare. The inert fluid coating may be a substance that subsequently hardens, e.g. polyvinyl alcohol or acrylic.

I claim:

1. A method of improvement of light transmission through a reflective/transmissive surface comprising external surface irregularities, said method comprising
   first creating said surface irregularities by providing an anti-glare dispersion of polyvinyl acetate particulates and water, applying said dispersion and allowing the dispersion to dry to form a coating that reduces reflected glare at said surface, while allowing transmission of light through the surface to permit viewing of objects behind the surface, and then
   applying an inert liquid coating sufficiently thick to remove at least some, but not all, of the anti-glare effect of the surface irregularities.

2. The method of claim 1 wherein said surface is a viewing surface of an electronic screen.

3. The method of claim 1 wherein said inert liquid coating is applied and then portions thereof are removed to achieve controlled transmission.

4. The method of claim 3 wherein said inert liquid coating is applied to a thickness that covers all particulates on said surface, and said fluid coating is then removed to a thickness that exposes some, but not all, of said particulates.

5. The method of claim 1 wherein said inert fluid is a hydrocarbon.

6. The method of claim 1 wherein said inert fluid is selected from:
hydrocarbon waxes and oils, clear acrylic coatings, polyethylene glycol, dibutylpthalates, polyvinyl alcohol, tributoxyethyl phosphates, dioctylpthalates, fatty acids, polyethylene, esters, squalane, polysynlane, hydraulic oil, sperm oil, automotive engine oil, technical oils, mineral oil, and vegetable oils.

7. A method of improvement of light transmission through a reflective/transmissive surface comprising surface irregularities, said method comprising
(a) first creating said surface irregularities by
   (1) providing anti-glare dispersion comprising
      a matte varnish comprising an aqueous dispersion of an acrylic resin, and
      an aqueous dispersion of polyvinyl acetate, (2) applying said anti-glare dispersion and allowing said anti-glare dispersion to dry to form a coating that reduces reflected glare at said surface, while allowing transmission of light through said surface to permit viewing of objects behind the surface, and then (b) applying an inert liquid coating sufficiently thick to remove at least some, but not all, of the anti-glare effect of the surface irregularities.

8. A method of improvement of light transmission through a reflective/transmissive surface comprising external surface irregularities, said method comprising first creating said surface irregularities by providing an anti-glare dispersion of acrylic particulates and water, applying said dispersion, and allowing the dispersion to dry to form a coating that reduces reflected glare at said surface, while allowing transmission of light through the surface to permit viewing of objects behind the surface, and then applying an inert liquid coating sufficiently thick to remove at least some, but not all, of the anti-glare effect of the surface irregularities.

9. The method of claim 1, 7 or 8 wherein said anti-glare dispersion further comprises an alcohol.

* * * * *